Patented Apr. 11, 1950

2,503,280

UNITED STATES PATENT OFFICE 2,503,280

AZO CATALYSTS IN PREPARATION OF SULFONIC ACIDS

William Howard Lockwood, Wilmington, Del., assignor to E. I. du Pont de Nemours & Company, Wilmington, Del., a corporation of Delaware No Drawing. Application October 24, 1947, Serial No. 782,009

6 Claims. (Cl. 260—513)

This invention relates to the preparation of aliphatic sulfonic acids and particularly to their preparation from aliphatic hydrocarbons.

Aliphatic sulfonic acids have, according to German Patent No. 735,096, been prepared from saturated aliphatic hydrocarbons, sulfur dioxide and oxygen, employing ultraviolet light.

Aliphatic sulfonic acids are of use as wetting agents, detergents, etc. and their preparation from relatively low cost aliphatic hydrocarbons is of importance.

This invention has as an object the preparation of aliphatic sulfonic acids. Another object is the preparation of aliphatic sulfonic acids from aliphatic hydrocarbons. Other objects will appear hereinafter.

These objects are accomplished by the following invention wherein a saturated aliphatic compound free from amino, including substituted amino, groups, particularly such a compound having 8 to 25 carbons, is brought into contact with a mixture of sulfur dioxide and oxygen in the presence of, as an initiator for the sulfoxidation, an azo compound wherein both valences of the acyclic azo, —N=N—, group are attached to different carbons at least one, and preferably both, of which is tertiary and further bonded to a negative radical, neutral with respect to acidity, by carbon of said radical which carbon of said radical has its three remaining valences satisfied by oxygen or nitrogen, i. e. by elements of atomic number from 7 to 8. These neutral negative radicals are the nitrile, —CN, carbonamide, —CONH$_2$, and carbalkoxy radicals, the latter being of 2 to 7 carbons. The preferred azo catalysts have both valences attached to different tertiary carbons further bonded to such a negative group since these are active at lower temperatures. The reaction is preferably conducted in the presence of an acyl compound aliphatic in character, i. e. a carboxylic acid anhydride, chloride, or bromide or sulfonic acid chloride the latter being of 2 to 6 carbons. The reaction mixture is thereafter treated with water and gassed with a mixture of sulfur dioxide and oxygen. The reaction mixture after the second stage consists of two phases which may be separated into a recovered hydrocarbon layer and into an aqueous layer containing sulfonic acids, mixed with by-product sulfuric and organic acids.

The reaction vessel may be any suitable apparatus which provides for intimate mixing and dispersing of the gas stream in the hydrocarbon liquid. The gaseous mixture of sulfur dioxide and oxygen is obtained by conventional means and measured by conventional devices.

The invention is described in greater detail in the illustrative examples below. The reactions in the examples below were carried out in a standard, one-liter, four-necked, round-bottomed, borosilicate glass flask, equipped with a stirrer and ground-glass joints, and fitted with a reflux condenser, thermometer, and a gas-inlet tube. The gas-inlet tube extended well below the level of the liquid contents of the flask. The flask was maintained at a desired constant temperature by means of a water bath. The gas rates were measured by conventional capillary flowmeters. The sulfur dioxide and oxygen were obtained from small ten-pound cylinders containing the respective liquid or compressed gas.

Example I

Into the flask described above were put 127 grams of dry, acid-washed cetane, 5 grams of acetic anhydride, and 2 grams of alpha, alpha'-azodiisobutyronitrile

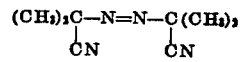

The mixture was gassed at 40° C. with a mixture of oxygen and sulfur dioxide flowing at rates of 8 grams per hour and 36 grams per hour, respectively. After thirty minutes, a portion of the azonitrile was still undissolved so the temperature was increased to 45° C. and the gassing continued for ninety minutes longer. At this time, the mixture consisted of two liquid phases with no undissolved solids remaining. The upper liquid layer was yellow and comprised approximately two-thirds the total volume; the lower liquid layer was orange and comprised the remaining one-third of the total contents. The contents of the flask had gained 22 grams in weight during the gassing in this first stage.

A mixture of 48 grams of water and 8 grams of glacial acetic acid was added to the flask through the reflux condenser, and the mixture was gassed at 60° C. for three hours with oxygen and sulfur dioxide at rates of 10 grams per hour and 40 grams per hour, respectively. The resultant contents of the flask appeared to be a homogeneous yellow emulsion, which, in about 15 minutes, separated into a water-white, upper layer of cetane, weighing 50 grams, and a yellow, bottom aqueous layer, weighing 172 grams. During this second stage, the contents gained 18 grams. 250 cubic centimeters of water were added to the aqueous layer, and the resulting milky emulsion was brought to a boil, causing the further separation of 14 grams more of cetane. The aqueous layer was boiled down to approximately its original volume, thus removing acetic acid and a further small quantity of cetane. The resulting solution, containing cetanesulfonic acids, sulfuric acid, and some small quantities of acetic acid and emulsified cetane, was neutralized with 85 cubic centimeters of 30% sodium hydroxide until faintly pink to phenolphthalein indicator. The neutral solution, weighing 242 grams, was amber in color and contained no undissolved solids. The solution analyzed for 42.2% total solids, and 29.3% sodium cetanesulfonate. It foamed readily and wetted-out a duck disc in four seconds. In the Draves-Clarkson test (Yearbook of the American Association of Textile Chemists and Colorists, 1945, page 222), the solutioon showed a wetting speed of 1.35 grams per liter in 25 seconds at 77° F. Such a solution is a valuable wetting agent and detergent.

Example II

The procedure described in Example I was followed using 127 grams of dry, acid-washed cyclohexane in place of the cetane. During the gassing in the first stage, at 45° C., the contents showed a gain in weight of 20 grams. During the gassing in the second stage, at 60° C., the contents showed a loss in weight of 53 grams. This was due to evaporation of the cyclohexane because of its greater volatility at the more elevated temperature. The loss of cyclohexane may be avoided by recycling the gases or by condensing the cyclohexane in a low temperature condenser, or by compression, or both. It could also be scrubbed out with a relatively non-volatile oil or other solvent. At the end of the gassing period, there was no separation of the mixture into a cyclohexane layer and an aqueous layer because of the evaporation of the hydrocarbon. The yellow liquid mixture of cyclohexanesulfonic acid, sulfuric acid, and acetic acid was neutralized with 80 cubic centimeters of 30% sodium hydroxide, forming a thick, pasty mass of tan plate-like crystals. The product, on a dry basis, contained 80% active ingredient as sodium cyclohexanesulfonate. It is useful as a dispersing agent for certain textile printing-pastes.

Example III

Into the apparatus previously described were placed 100 grams of dry, acid-washed cetane, 1 gram alpha,alpha'-azobis(alpha-methylenanthonitrile, $(C_4H_9-C(CH_3)(CN)-N=)_2$ and 3 cubic centimeters of acetic anhydride. The azonitrile catalyst was readily soluble in the cetane. The mixture was gassed for two hours at 40° C. with 8 grams per hour of oxygen and 36 grams per hour of sulfur dioxide. The mixture gained 8 grams during the gassing of this first stage.

A mixture of 45 cubic centimeters of water and 5 cubic centimeters of glacial acetic acid was added to the flask and the mixture was gassed for 3 hours at 60° C. with 10 grams per hour of oxygen and 40 grams per hour of sulfur dioxide. During this second stage, the mixture gained six grams. The contents were separated into a water-white recovered cetane layer weighing 74 grams; and a yellow, aqueous layer weighing 88 grams. The aqueous layer containing cetane-sulfonic acids was neutralized with 26 cubic centimeters of 30% sodium hydroxide, forming 114 grams of sodium cetane-sulfonate solution. This solution foamed readily and wetted a duck disc in two seconds. It contained 33.4% total solids and 21.6% sodium cetanesulfonate.

Example IV

Into the apparatus previously described were placed 100 grams of dry, acid-washed cetane, 1 gram of 1,1'-azo-dicyclohexanecarbonitrile, and 3 cubic centimeters of acetic anhydride. The azonitrile catalyst was readily soluble in the cetane. The mixture was gassed for two hours at 40° C. with 8 grams per hour of oxygen and 36 grams per hour of sulfur dioxide. A mixture of 45 cubic centimeters of water and 5 cubic centimeters of glacial acetic acid was added to the flask, and the mixture gassed three hours at 60° C. with 10 grams per hour of oxygen and 40 grams per hour of sulfur dioxide. The mixture was separated into a cetane layer and an aqueous sulfonic acid layer, and the aqueous layer neutralized, as in previous examples. The solution contained 13 grams of sodium cetanesulfonate. It foamed readily and wetted a duck disc in two seconds.

Example V

Into the apparatus previously described were placed 100 grams of dry, acid-washed cyclohexane, 1 gram of alpha,alpha'-azobis(alpha-methylenanthonitrile), and 3 cubic centimeters of acetic anhydride. The azonitrile catalyst was readily soluble in the cyclohexane.

The mixture was gassed for two hours at 40° C. with 8 grams per hour of oxygen and 36 grams per hour of sulfur dioxide. Approximately one-half of the mixture had been converted to an amber-colored, bottom layer. The mixture had gained 30 grams during this first stage. A mixture of 45 cubic centimeters of water and 5 cubic centimeters of glacial acetic acid was added to the flask, and the mixture was gassed three hours at 60° C. with 10 grams per hour of oxygen and 40 grams per hour of sulfur dioxide. There was no hydrocarbon layer since all the cyclohexane had evaporated. The solution of cyclohexanesulfonic acid, sulfuric acid, and acetic acid was neutralized with 72 cubic centimeters of 30% sodium hydroxide. The product formed a pasty mass of plate-like, tan crystals, and contained a mixture of sodium cyclohexanesulfonate, sodium sulfate, and sodium acetate.

Example VI

Into the apparatus previously described were placed 100 grams of dry, acid-washed cyclohexane, 1 gram of 1,1'-azodicyclohexanecarbonitrile, and 3 cubic centimeters of acetic anhydride. The azonitrile catalyst was readily soluble in the cyclohexane. The mixture was gassed for two hours at 40° C. with 8 grams per hour of oxygen and 36 grams per hour of sulfur dioxide. Approximately one-half of the mixture had been converted to an amber-colored bottom layer. The mixture had gained 11 grams during this first stage. A mixture of 45 cubic centimeters of water and 5 cubic centimeters of glacial acetic acid was added to the flask and the mixture was gassed three hours at 60° C. with 10 grams per hour of oxygen and 40 grams per hour of sulfur dioxide. Because of the evaporation of the volatile cyclohexane, there was a loss of 33 grams during this second gassing stage. The mixture was separated into a recovered cyclohexane layer weighing 23 grams, and an aqueous cyclohexanesulfonic acid layer weighing 103 grams. The aqueous layer was neutralized with 57 cubic centimeters of 30% sodium hydroxide, forming a thick paste of tan, plate-like crystals. The total solids consisted of 73% sodium cyclohexanesulfonate, 25% sodium sulfate, and the remainder, probably sodium acetate.

*Example VII*

Into the apparatus previously described were placed 100 grams of a paraffin base mineral wax, free from olefinic and unsaturated constituents, having a distillation range at 10 millimeters pressure of 160° C. to 243° C., a freezing point of 30.5° C. to 32.5° C., a specific gravity of 15.5° C. of 0.7756, a refractive index at 176° F. of 1.4188, and a Saybolt Universal viscosity at 100° F. of 43.8 seconds. To the wax were added 3 cubic centimeters of acetic anhydride, and 1 gram of alpha,alpha'-azobis(alpha,gamma-dimethylvaleronitrile). The mixture was gassed two hours at 40° C. with 8 grams per hour of oxygen and 36 grams per hour of sulfur dioxide. A small pool of brown oil had formed in the bottom of the melted wax layer during the gassing. Water (100 cubic centimeters) was added, and the mixture was gassed three hours at 60° C. with 10 grams per hour of oxygen and 40 grams per hour of sulfur dioxide. During both gassing stages there was a total gain of 6 grams. The mixture was separated into a recovered wax layer weighing 86 grams, and an aqueous layer weighing 119 grams. The aqueous layer was neutralized with 21 cubic centimeters of 30% sodium hydroxide, forming a clear, amber solution which foamed readily. Sodium sulfate (10 grams) was added to the solution, and the mixture diluted with water to a volume of 250 cubic centimeters. This solution was dried to a brown, waxy solid on a small single drum drier. The dried product was extracted with methyl alcohol for 18 hours in a Soxhlet extractor. The methyl alcohol extract was evaporated to dryness and the tan, waxy residue was further dried overnight in a vacuum desiccator. The product, weighing 6 grams, foamed readily in water solution. It contained 76% of sodium hydrocarbon sulfonate. Such a product is useful as a wetting agent and detergent.

*Example VIII*

Into the apparatus previously described were placed 100 grams of a dry, acid-washed, refined, paraffin base white oil having an average molecular weight of 225 and the following characteristics: boiling range of 266° C. to 312° C., Saybolt Universal viscosity at 100° F. of 36.5 seconds, specific gravity at 15.5° C./15.5° C. of 0.803, and refractive index at 20° C. of 1.442. To the oil were added 3 cubic centimeters of acetic anhydride and 1 gram of alpha,alpha'-azobis(alpha,gamma-dimethylvaleronitrile). The mixture was gassed and neutralized as described in Example VII. The aqueous solution of the sodium hydrocarbon sulfonates foamed readily, and wetted a canvas duck disc in three seconds. Such a product is useful as a detergent and wetting agent.

*Example IX*

Into the apparatus outlined above were placed 100 grams of dry, acid-washed ethylcyclohexane, 1 gram of alpha,alpha'-azobis(alpha,gamma-dimethylvaleronitrile), and 3 cubic centimeters of acetic anhydride. The mixture was gassed and neutralized as described in Example VII. The aqueous solution contained 15 grams of sodium ethylcyclohexanesulfonate.

*Example X*

Into the apparatus previously described were placed 100 grams of mononitrocyclohexane, 3 cubic centimeters of acetic anhydride, and 1 gram of alpha,alpha'-azobis(alpha,gamma-dimethylvaleronitrile). The mixture was gassed and neutralized as described in Example VII. The aqueous solution contained 1.3 grams of sodium nitrocyclohexanesulfonate.

*Example XI*

Into the apparatus previously described were placed 100 grams of dry, acid-washed cyclohexane, 3 cubic centimeters of acetyl chloride, and 1 gram of alpha,alpha'-azobis(alpha,gamma-dimethylvaleronitrile). The mixture was gassed as described in Example VII. During the first gassing stage the contents had gained 44 grams; and approximately two-thirds of the contents had been converted to a yellow liquid insoluble in the cyclohexane. During the second gassing stage there was a loss of 55 grams due to evaporation of the cyclohexane at the more elevated temperature. The remaining cyclohexane was evaporated on the steam bath and the aqueous solution was neutralized with 88 cubic centimeters of 30% sodium hydroxide. The product was a pasty mass of tan, plate-like crystals, containing 100 grams of sodium cyclohexanesulfonate.

*Example XII*

Into the apparatus previously described were placed 100 grams of dry, acid-washed cyclohexane, 3 cubic centimeters of propanesulfonyl chloride, and 1 gram of alpha-alpha'-azobis(alpha,gamma-dimethylvaleronitrile). The mixture was gassed as described in Example VII. During the first gassing stage the contents had gained 19 grams; and approximately one-half of the contents had been converted to a yellow liquid, insoluble in the cyclohexane. During the second gassing stage there was a loss in weight because of evaporation of the cyclohexane. The mixture was separated into a water-white, recovered cyclohexane layer weighing 41 grams; and a yellow aqueous layer weighing 104 grams. The aqueous layer was neutralized with 52 cubic centimeters of 30% sodium hydroxide. The product was a pasty mass of tan, plate-like crystals, containing 50 grams of sodium cyclohexanesulfonate.

*Example XIII*

Into the apparatus previously described were placed 100 grams of dry, acid-washed cetane, 3 cubic centimeters of acetic anhydride, and 1 gram of alpha,alpha'-azobis(alpha,gamma-dimethylvaleronitrile). The apparatus was modified in that a transparent quartz flask was used; and the flask was illuminated with a high pressure quartz mercury arc lamp, 29% of the radiation of which was in the range 1800–4000 Angstrom units. The short wave-length ultraviolet rays from the lamp were cut out by using a modified silica glass filter, having a transmission range of 0% at 2700 Å. and 90% at 3700 Å. The maximum transmission is, therefore, in the same region (3600 Å.) as the characteristic azo group maximum absorption as shown in absorption spectra curves for azonitriles. The mixture was gassed as described in Example VII. During the first gassing stage the contents had gained 19 grams; approximately one-half of the contents had been converted to a light-orange oil layer on the bottom of the unreacted cetane. After the addition of 50 cubic centimeters of water, the mixture gained 11 grams during the second gassing stage. The mixture was separated into a recovered cetane layer weighing 62 grams, and an aqueous sulfonic acid layer weighing 142 grams. The aqueous layer was neutralized with 56 cubic centimeters of 30% sodium hydroxide, forming a solution which contained 52 grams of sodium cetanesulfonate.

*Example XIV*

Into a two-liter round-bottom, borosilicate glass flask fitted with thermometer, agitator, and gas inlet and outlet tubes were placed 200 g. of cetane and 4 grams of azobis(alpha,gamma-dimethylvaleronitrile). The mixture was heated to 60° C. and a gaseous mixture of 182 grams of sulfur dioxide and 36 grams of oxygen was passed into the agitated mixture over a period of two hours. A temperature rise to 61–64° C. in the flask and faint white fumes at the gas outlet were evidence of a mild reaction. The gassed mixture was made just alkaline to phenolphthalein indicator at 30–35° C. with 25 g. of 30% sodium hydroxide. The resulting emulsion was separated into an oil and an aqueous phase by dilution with about 300 cc. of water and about 50 cc. of ethyl alcohol. The oil layer comprised 180 g. of unreacted cetane. The aqueous-alcohol layer was extracted twice with 100 cc. portions of hexane, boiled vigorously to remove the low-boiling solvent (hexane, alcohol), and adjusted to a weight of 500 g. with water. This aqueous solution showed by analysis 4.4% sodium aliphatic sulfonate (molecular weight 337) calculated as 90% monosulfonate and 10% disulfonate, which is a yield of 22 g. Increasing the reaction time increases the amount of sulfonic acid formed. The unreacted sulfur dioxide and oxygen may be recycled.

*Example XV*

In a 500 cc. borosilicate glass flask a mixture of 100 g. of cetane and 1 g. of azobisisobutyronitrile was gassed for 2 hours with a mixture of 255 g. of sulfur dioxide and 59 g. of oxygen at 60° C. The flask was illuminated by light from a 150 watt projector lamp. From the gassed mixture after extraction with water and neutralization with sodium hydroxide, 92.3 g. of unreacted cetane was obtained. The aqueous phase after extraction with hexane, boiling and adjustment of the weight to 250 g. showed by analysis 0.71% sodium aliphatic sulfonate (molecular weight 377). This corresponds to a yield of 1.8 g.

*Example XVI*

By the same procedure as outlined in Example I, 200 g. of cyclohexane and 1 g. of azobis(alpha-methylenanthonitrile) were gassed with 253 g. of sulfur dioxide and 61 g. of oxygen. A decrease in weight of 76 g. on gassing showed an appreciable loss of cyclohexane. The gassed mixture consisted of an unreacted oil layer and an orange colored water-soluble lower layer comprising about 15% of the total volume. The combined layers required 26 g. of 30% sodium hydroxide for neutralization and yielded 65 g. of unreacted cyclohexane and 139 g. of an aqueous solution of a mixture of sodium cyclohexanemonosulfonate and sodium cyclohexanedisulfonate (average molecular weight 196). The aqueous solution showed by analysis 2.9% organic sulfur, which corresponds to a yield of 24.7 g.

*Example XVII*

By the same procedure as in the preceding examples 200 g. of a highly paraffinic hydrocarbon fraction boiling between 265° C. and 305° C. and free from unsaturated constituents and having a specific gravity of 0.801 at 15.5° C. was gassed with 261 g. of sulfur dioxide and 68 g. of oxygen in the presence of 1 g. of azobis(alpha,-gamma-dimethylvalero-nitrile) and 32 cc. of water. Neutralization of the gassed mixture required 15.2 g. of 30% sodium hydroxide. The oil layer consisted of 196 g. of unreacted oil. The aqueous layer, adjusted to 500 g., showed by analysis 0.3% sodium aliphatic sulfonate (molecular weight 358) which is a yield of 1.6 g.

In the process of this invention there may be sulfoxidized, i. e. reacted with sulfur dioxide and oxygen, any saturated organic compound aliphatic in character, i. e. non-aromatic, and free from amino, including substituted amino, groups, by reacting the same with sulfur dioxide and oxygen in the presence of the azo catalysts of this invention.

The preferred saturated organic compounds of aliphatic character are the non-aromatic saturated hydrocarbons which can be converted to the respective mono or polysulfonic acids by this method. The presence of olefinic or unsaturated hydrocarbons inhibits this reaction markedly, therefore, it is important that such compounds be removed from the material to be converted to sulfonic acid. The effect of branching decreases the rate of reaction, therefore, a mixture of branched hydrocarbons such as the oil of Example VIII, reacts more slowly than a straight chain hydrocarbon such as cetane. Similarly the branching in ethylcyclohexane causes it to react more slowly than cyclohexane.

Substitution of certain functional groups slows down, but does not prevent the sulfoxidation to sulfonic acid; thus nitrocyclohexane is converted to nitrocyclohexanesulfonic acid more slowly than is cyclohexane itself. Similarly nitrohexadecane is converted to nitrohexadecanesulfonic acid. Classes of suitable operable saturated organic compounds of aliphatic character are the following:

1. Saturated aliphatic straight and branched chain hydrocarbons, e. g. pentane, isooctane, cetane, saturated white oils and paraffin waxes.

2. Saturated alicyclic hydrocarbons, e. g. cyclohexane, ethylcyclohexane, methane, and naphthenes.

3. Alkyl halides containing at least eight carbons, e. g. chlorocyclohexane, cetyl bromide, and chlorinated white oils.

4. Aliphatic carboxylic acids, and acid halides containing at least eight carbons, e. g. stearic acid and stearoyl chloride.

5. Aliphatic sulfonic acids and sulfonyl chlorides, such as cetanesulfonic acid and cyclohexanesulfonyl chloride.

6. Aliphatic alcohols and mercaptans containing at least eight carbons, e. g. cetyl alcohol, cetyl mercaptan.

7. Aliphatic ketones containing at least eight carbons, e. g. hexadecanone-8.

8. Esters of aliphatic acids containing a total of at least eight carbons, e. g. methyl stearate, saturated palm oil.

9. Aliphatic ethers and thio-ethers, such as dicyclohexyl ether, dicyclohexyl sulfide.

10. Aliphatic nitriles containing at least eight carbons, e. g. hexadecane nitrile.

11. Aliphatic nitro compounds, such as nitrocyclohexane, and 1-nitropropane.

When the process of this invention is applied to substituted hydrocarbons the reaction is in general definitely slowed. Some substituents, e. g. —Cl, —COOH, —OH, slow down the reaction more than others, e. g. —SO₃H, —NO₂. The smaller the number of carbons in the compound the greater is the decelerating effect, hence the recommendations given above in certain categories for carbon content of at least eight carbons. Those of lower carbon content, while operable, react too slowly to be of much interest.

In the process of this invention there is employed an acyl compound either an aliphatic or cycloaliphatic carboxylic acid chloride or bromide, e. g. acetyl chloride or bromide, propionyl chloride, cyclohexanecarbonyl chloride, an aliphatic carboxylic acid anhydride of acid containing 2 to 6 carbons, e. g. acetic anhydride, butyric anhydride or a sulfonyl chloride, e. g. ethanesulfonyl chloride and hexanesulfonyl chloride. The lower molecular weight compounds such as acetic anhydride and acetyl chloride are more effective than their higher molecular weight homologs such as caproic anhydride or caproyl chloride. Acetyl compounds are therefore preferred.

In the process of this invention there may be employed as initiator of the reaction any azo compound wherein both valences of the acyclic azo, —N=N—, group are attached to different carbons at least one, and preferably both, of which are tertiary and attached to a negative radical, neutral with respect to acidity, by carbon of said radical the remaining valences of said carbon being satisfied by oxygen or nitrogen, i. e. by elements of atomic number of seven to eight. These negative groups are the nitrile, carbonamido, and carbalkoxy groups, the latter being desirably of two to seven carbons. Exemplary azo compounds which may be employed in the process of this invention include alpha,alpha'-azodiisobutyronitrile, alpha,alpha'-azobis(alpha,gamma-dimethylvaleronitrile), alpha,alpha' - azobis-(alpha - ethylbutyronitrile), azo - dicyclohexanecarbonitrile, azobis(alpha - methylbutyronitrile), alpha,alpha ' - azobis ( alpha - methylenanthoni - trile), methyl alpha,alpha'-azodiisobutyrate, ethyl alpha,alpha'-azobis(alpha,gamma - dimethylvalerate ) , ethyl alpha,alpha ' - azodiisobutyrate, hexyl alpha,alpha'-azo - diisobutyrate, azo-diisobutyramide, alpha,alpha ' - azobis(alpha,gamma-dimethylvaleramide), and alpha,alpha' - azobis-(alpha,alpha ' - cyclopropylpropionitrile). Compounds having a nitrile group on one or both of the carbons bonded to the azo nitrogens are preferred. Symmetrical compounds are preferred.

The relative weight ratios of the sulfur dioxide and oxygen may vary, but it is preferred to have an excess of sulfur dioxide. In the examples cited, a four to one ratio (by weight) of sulfur dioxide to oxygen was used. Ratios between 2 to 1 and 6 to 1 are operative, while the preferred ratio is 4 to 1.

This method is not limited to the use of sulfur dioxide and oxygen as sulfoxidation agents; but will also proceed using sulfur dioxide and air. Substitution of air or other mixture of oxygen with inert gas for oxygen, however, decreases the reaction rate appreciably.

The rate of gassing may vary. The unreacted gases may be collected from the reaction vessel, and recycled. The operation can be carried out under moderately increased pressure. This increases the solubility of the gases and increases the rate of reaction.

The temperatures used in this reaction are not restricted to the temperatures used in the examples. Ranges from +20° C. to 80° C. may be used in both gassing stages, depending on the nature of the azonitrile catalyst used. Caution should be observed at the more elevated temperatures since the peroxide intermediates formed in the reaction can possibly explode. In the second gassing stage the amount of water is not critical. From ½ to 10 times the weight of hydrocarbon can be used. An aqueous solution of propionic acid could be used.

The monosulfonates of the hydrocarbons are usually more valuable than the di- or polysulfonates. It is preferred to operate the process to produce a large proportion of monosulfonate. This is accomplished by reacting only a portion of the hydrocarbon, usually 10% to 50% and then working up the product. The unreacted hydrocarbon may then be recycled to the reaction. The reaction may be run as a continuous process.

These azonitrile catalysts can be used more advantageously than hydrogen peroxide. They are easier to handle and to store; also they are safer, since they do not form explosive organic peroxides. The azonitrile catalysts are also activated by light of wave lengths which are transmitted through "Pyrex," i. e. borosilicate glass, and so convert such light energy into activation energy. Conversion of light energy into activation energy without the azonitrile catalysts requires the use of quartz apparatus in order to transmit the lower ultraviolet wave lengths. Thus, from the point of view of light activation, the use of azonitriles effects a major equipment saving. Further, the use of azonitriles in conjunction with light effects a better energy efficiency than does the use of light alone through quartz apparatus. However, it is to be understood, of course, that the azonitrile catalysts are sufficiently active in the absence of light.

The sulfonic acids obtained by the process of this invention are of use as surface active agents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the preparation of a sulfonic acid from sulfur dioxide, oxygen, and a hydrocarbon of the class consisting of saturated aliphatic hydrocarbons and saturated cycloaliphatic hydrocarbons the improvement wherein the sulfur dioxide, oxygen, and hydrocarbon are brought into contact with each other and a catalyst of the class consisting of alpha,alpha'-azobis(cyanoalkanes) wherein the cyano group of the cyanoalkyl radical is attached to tertiary carbon which is attached to azo nitrogen and alpha,alpha'-azobis(cyanocycloalkanes) wherein the cyano group of the cyanocycloalkyl radical is attached to tertiary carbon which is attached to azo nitrogen.

2. Process of claim 1 wherein acetic anhydride is additionally employed.

3. Process of claim 1 wherein the compound sulfoxidized is a saturated aliphatic hydrocarbon.

4. Process of claim 1 wherein the azo compound is alpha,alpha'-azodiisobutyronitrile.

5. In the preparation of a sulfonic acid from sulfur dioxide, oxygen, and a saturated aliphatic hydrocarbon, the improvement wherein the sulfur dioxide, oxygen, and hydrocarbon are brought into contact with each other and, as a catalyst, an alpha,alpha'-azobis(cyanoalkane) wherein the cyano groups of the cyanoalkyl radical is attached to tertiary carbon which is attached to azo nitrogen.

6. In the preparation of a sulfonic acid from sulfur dioxide, oxygen, and a saturated cycloaliphatic hydrocarbon, the improvement wherein the sulfur dioxide, oxygen, and hydrocarbon are brought into contact with each other and, as a catalyst, an alpha,alpha' - azobis(cyanoalkane) wherein the cyano groups of the cyanoalkyl radical is attached to tertiary carbon which is attached to azo nitrogen.

WILLIAM HOWARD LOCKWOOD.

REFERENCES CITED

The following references are of record in the file of this patent:

FOREIGN PATENTS

| Number | Country | Date |
|--------|---------|------|
| 735,096 | Germany | Apr. 1, 1943 |

OTHER REFERENCES

Annalen, vol. 290, pages 1 to 43, 1896.